(12) United States Patent
Hosoya et al.

(10) Patent No.: US 7,191,264 B2
(45) Date of Patent: Mar. 13, 2007

(54) DISK CONTROL APPARATUS

(75) Inventors: Mutsumi Hosoya, Fujimi (JP);
Kazuhisa Fujimoto, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 148 days.

(21) Appl. No.: 10/960,922

(22) Filed: Oct. 12, 2004

(65) Prior Publication Data
US 2005/0210165 A1    Sep. 22, 2005

Related U.S. Application Data

(63) Continuation of application No. 10/207,970, filed on Jul. 31, 2002, now Pat. No. 6,813,655.

(30) Foreign Application Priority Data

May 24, 2002  (JP) .............................. 2002-150135

(51) Int. Cl.
*G06F 13/38* (2006.01)
(52) U.S. Cl. ........................... 710/74; 710/31; 710/72; 711/114
(58) Field of Classification Search .................... 710/5, 710/31, 72, 74, 316; 711/112, 113, 118, 711/114
See application file for complete search history.

(56) References Cited

U.S. PATENT DOCUMENTS

| 5,819,054 | A | 10/1998 | Ninomiya et al. ............ 712/3 |
| 5,878,204 | A * | 3/1999 | Kobayashi et al. ........... 714/9 |
| 6,092,216 | A * | 7/2000 | Kobayashi et al. ........... 714/9 |
| 6,389,494 | B1 | 5/2002 | Walton et al. .............. 710/317 |
| 6,397,267 | B1 | 5/2002 | Chong, Jr. ..................... 710/1 |
| 6,594,739 | B1 | 7/2003 | Walton et al. .............. 711/155 |
| 6,611,879 | B1 | 8/2003 | Dobecki ........................ 710/1 |
| 6,636,934 | B1 | 10/2003 | Linell et al. .................... 711/1 |
| 6,684,295 | B2 | 1/2004 | Fujimoto et al. ........... 711/113 |
| 6,754,769 | B2 | 6/2004 | Kawano ..................... 711/114 |
| 2003/0084237 | A1 * | 5/2003 | Yoshida et al. ............. 711/112 |
| 2003/0154397 | A1 * | 8/2003 | Larsen ....................... 713/201 |

FOREIGN PATENT DOCUMENTS

| JP | 11-175260 | 12/1997 |
| JP | 2000-099281 | 9/1998 |

* cited by examiner

*Primary Examiner*—Fritz Fleming
*Assistant Examiner*—Harold Kim
(74) *Attorney, Agent, or Firm*—Reed Smith LLP; Stanley P. Fisher, Esq.; Juan Carlos A. Marquez, Esq.

(57) ABSTRACT

Disclosed is a disk control apparatus with excellent scalability realized on the same architecture, in high quality and reliability, regardless of its scale. Each of a plurality of channel interface units and a cache memory unit as well as each of a plurality of disk interface units and the cache memory unit are connected through a switch and a data path network (solid line) in each disk control cluster. Each switch provided outside each disk control cluster is connected to the switch in each disk control cluster through the data path network. A resource management unit is provided outside each disk control cluster and the resource management unit is connected to each of the plurality of channel interface units/disk interface units, as well as to the cache memory unit in each disk control cluster. The resource management unit is also connected to each switch provided outside each disk control cluster through a resource management network (dotted line).

9 Claims, 10 Drawing Sheets

F I G. 1
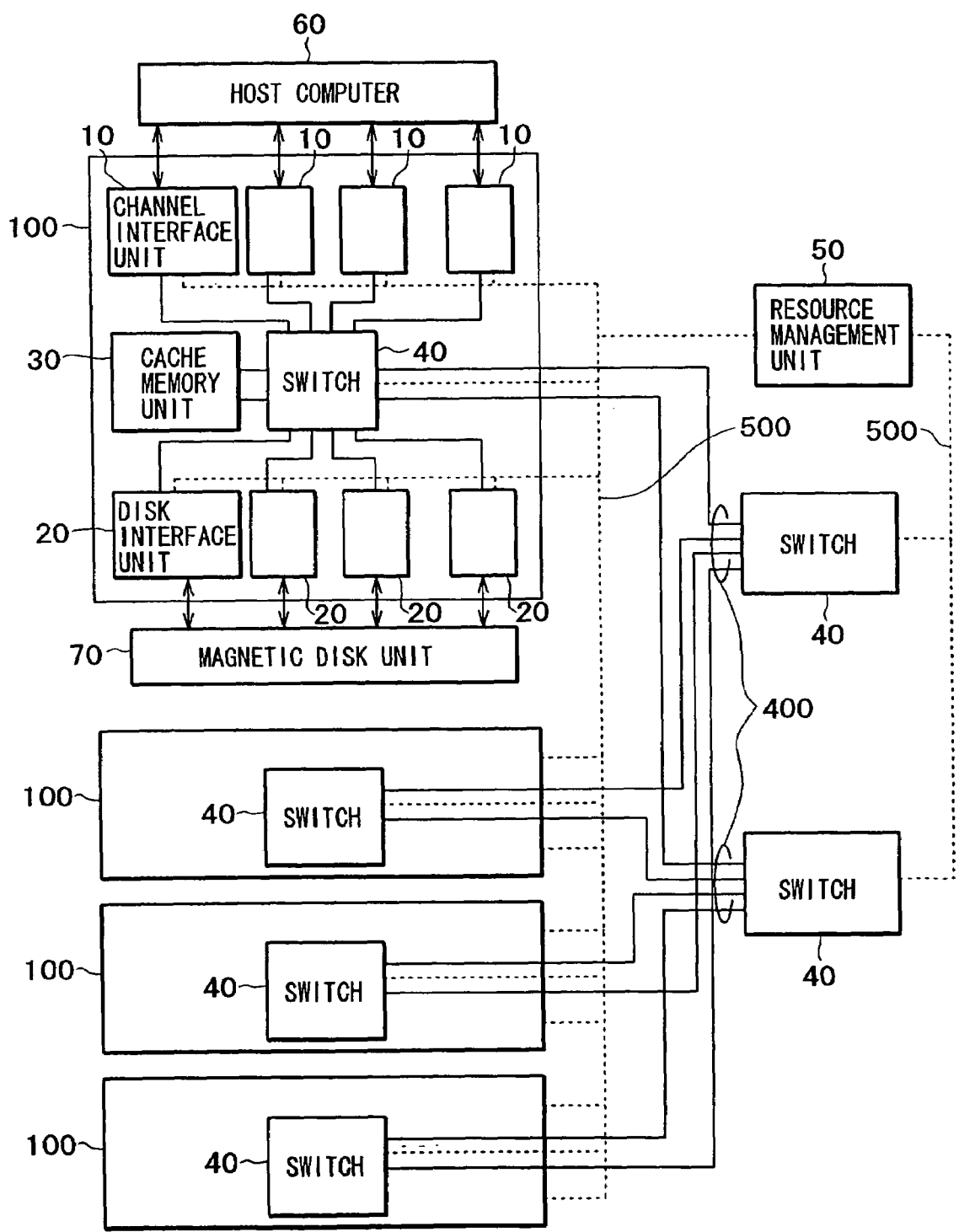

FIG. 4

| ADDRESS | CONDITION 1 | CONDITION 2 | CONDITION n |
|---|---|---|---|
| L1 | P1 | P1 | P2 |
| L2 | P3 | P1 | |
| | | | |
| Lm | P2 | P2 | |

…

DISK CONTROL APPARATUS

CROSS-REFERENCE TO RELATED APPLICATIONS

This application is a Continuation application of U.S. application Ser. No. 10/207,970 filed on Jul. 31, 2002 now U.S. Pat. No. 6,813,655. Priority is claimed based on U.S. application Ser. No. 10/207,970 filed on Jul. 31, 2002, which claims priority to Japanese Patent Application No. 2002-150135 filed on May 24, 2002.

BACKGROUND OF THE INVENTION

1. Field of the Invention

The present invention relates to a disk control apparatus employed for a disk system apparatus that enables data to be stored in plural magnetic disk units.

2. Description of Related Art

Many efforts have been made to bring input/output performance of a disk subsystem (referred to as subsystem, hereinafter) which uses magnetic disks as recording media, close to that of a computer equipped with main memory, which uses a semiconductor storage unit as recording media, because the performance of the former is as low as about $1/1000$ to $1/10000$ of that of the latter.

Employment of a disk control apparatus that enables data to be stored in plural magnetic disk units is one of the methods for improving the input/output performance of the subsystem.

For example, the conventional well-known disk control apparatus shown in FIG. 6 includes one or more disk control clusters (referred to as the cluster, hereinafter) 101 in addition to plural channel interface units 10 used to transfer data between a host computer 60 and the cluster 101, plural disk interface units 20 used to transfer data between a magnetic disk unit 70 and the cluster 101, a cache memory unit 30 used to store data to be read/written from/in the magnetic disk unit 70, and a resource management unit 90 used to store information related to the cluster 101 (for example, information related to the controlling of the data transfer between each of the channel interface units 10/disk interface units 20 and the cache memory unit 30, and management information of the data to be stored in the magnetic disk unit 70).

The disk capacity and the number of host channels connectable to one cluster 101 are limited. When data must be stored over the limited disk capacity and/or when host computers 60 in a number larger than that of host channels that can be connected to one cluster have to be connected, therefore, the disk control apparatus is provided with plural clusters 101.

A data path network 400 is used for the connection between each of the plurality of channel interface units 10/disk interface units 20 and the cache memory unit 30 over the plurality of clusters 101.

Similarly, a resource management network 500 is used for the connection between each of the plurality of channel interface units 10/disk interface units 20 and the resource management unit 90 over the plurality of clusters 101.

Consequently, the resource management unit 90 and the cache memory unit 30 can be accessed from every channel interface unit 10 and every disk interface unit 20.

Each of the channel interface units 10 includes an interface with a host computer 60 and a microprocessor (not shown) for controlling the input/output to/from the host computer 60.

Each of the disk interface units 20 includes an interface with a magnetic disk unit 70 and a microprocessor (not shown) for controlling the input/output to/from the magnetic disk unit 70.

The disk interface unit 20 is also used to execute the RAID functions.

The data path network 400 is configured so as to include one or more switches 80.

When data is transferred from a channel interface unit 10/disk interface unit 20 to the cache memory unit 30 through the data path network 400, packets are used for the data transfer. Each packet includes a destination address added to the initial position of the data written therein.

The transfer of those packets to the target cache memory unit 30 through the data path network 400 is controlled by the microprocessor provided in each channel interface unit 10 or disk interface unit 20.

Each switch 80, as shown in FIG. 7, includes plural path interfaces 41 connected to the data path network 400, plural packet buffers 43 and plural address latches 44, as well as a selector 48.

In each path interface 41, a header analyzer 42 is included. The header analyzer 42 is used to take out address information from each packet, thereby the analyzed and extracted packet address is fetched into the corresponding address latch 44.

On the other hand, received packets are stored in a packet buffer 43 through the corresponding path interface 41.

Each address latch 44 generates a selector control signal 47 according to the destination address of each packet and the selector 48 selects a path to the destination address of each packet stored in the packet buffer 43.

In this way, the path change for each packet in the conventional switch 80 is decided fixedly by the packet address.

This is why a path of packets through the data network 400 must be preset under the control of the microprocessor built in the subject channel interface unit 10/disk interface unit 20.

Especially, when a packet is to pass plural switches 80 provided in the data path network 400, the path change information for those switches 80 is added to the packet in prior to the transfer.

The latest business environment, which is rapidly changing day by day, demands a high scalability disk control apparatus that allows a user to expand his/her business facilities step by step while suppressing his/her initial investment cost.

Such disk control apparatus needs to have high scalability that can cope with various scales of company's facilities, ranging from small to very large scale, to meet the users' needs. This demands that the apparatus needs to have flexibility to cope with the number of channels for connections to host computers, as well as with data capacity of each of its magnetic disk units.

The conventional techniques shown in FIGS. 6 through 8 have been difficult to flexibly change the configuration of the channel interface unit/disk interface unit for the connections to the host computers in correspondence with the users' needs, since a microprogram presets the path on the way in the data bus network 400 between each of the channel interface units 10/disk interface units 20 and the cache memory unit 30.

In addition, the packet traffic in the data path network 400 has a partiality. Any of the conventional techniques described above, which fixes the path of packets cannot realize path optimization while the path for packet transfer can be optimized to increase the total number of packets to be transferred in the data path network 400.

This is why the performance of the disk control apparatus has been degraded significantly due to the band limitation of the data path network 400 while the number of the channel interface units 10/disk interface units 20 increases.

Furthermore, when the disk control apparatus is configured by plural clusters 101, the microprocessor in each channel interface unit 10 or disk interface unit 20 is required to control every switch 80 in the path for path changes. Along with an increase in the number of the clusters 101, the connections to those clusters 101 come to be complicated, the processing load of the microprocessors increases, thereby the data transfer to/from the host computer 60 and the magnetic disk unit 70 is often disturbed. This is why the performance of the disk control apparatus has been degraded.

Under such circumstances, it is an object of the present invention to provide a disk control apparatus configured so as to realize scalability and enabled to change the configuration to a smaller/larger one with the same enhanced architecture of a high reliability, as well as to solve the problems of the conventional techniques.

More concretely, it is an object of the present invention to provide a disk control apparatus to be expanded flexibly in correspondence with users' requirements and enabled to adjust the connection state therein as needed, and furthermore to provide a disk control apparatus whose performance is prevented from degradation more effectively even in a configuration having a very large cluster scale.

SUMMARY OF THE INVENTION

In achieving the objects in one preferred aspect, we utilize a disk control apparatus having: a plurality of channel interface units, each having an interface with a host computer; a plurality of disk interface units, each having an interface with a magnetic disk unit; a cache memory unit for temporarily storing data to be read/written from/in the magnetic disk unit; and a resource management unit for storing control information related to the data transfer between the plurality of channel interface units/disk interface units and the cache memory unit, wherein:

each of the plurality of channel interface units transfers data between its interface with the host computer and the cache memory unit while each of the plurality of disk interface units transfers data between its interface with the magnetic disk unit and the cache memory unit; and a data path network is used for the connection between the plurality of channel interface units and the cache memory, as well as between the plurality of disk interface units and the cache memory unit through one or more switches;

each of the switches includes a path change table used to specify a path in the data path network and changing means used to change the table to another.

In another aspect, we utilize the disk control apparatus wherein a data path network is used for the connection between the plurality of channel interface units and the cache memory unit, as well as between the plurality of disk interface units and the cache memory unit through one or more switches;

a resource management network is used for the connection of the plurality of channel interface units, the plurality of disk interface units, and the one or more switches to the resource management unit; and each of the one or more switches includes a path change table used to specify a path in the data path network and changing means for changing the table to another.

In still another aspect, we utilize the disk control apparatus wherein a data path network is used for the connection between the plurality of channel interface units/the plurality of disk interface units and the resource management unit through one or more switches, as well as for the connection of the one or more switches to the resource management unit; and each of the one or more switches includes a path change table used to specify a path in the data path network and changing means for changing the table to another.

In yet another aspect, we utilize the disk control apparatus wherein the changing means of the switch obtains control information stored in the resource management unit to update the path change table in the switch according to a path cost calculated with use of the control information.

Other and further objects, features and advantages of the invention will appear more fully from the following description.

BRIEF DESCRIPTION OF THE DRAWINGS

FIG. 1 is a block diagram of a disk control apparatus of the present invention;

FIG. 4 is a configuration of a path change table used by the switch provided in the disk control apparatus of the present invention;

DETAILED DESCRIPTION OF THE PREFERRED EMBODIMENTS

Figure 2:
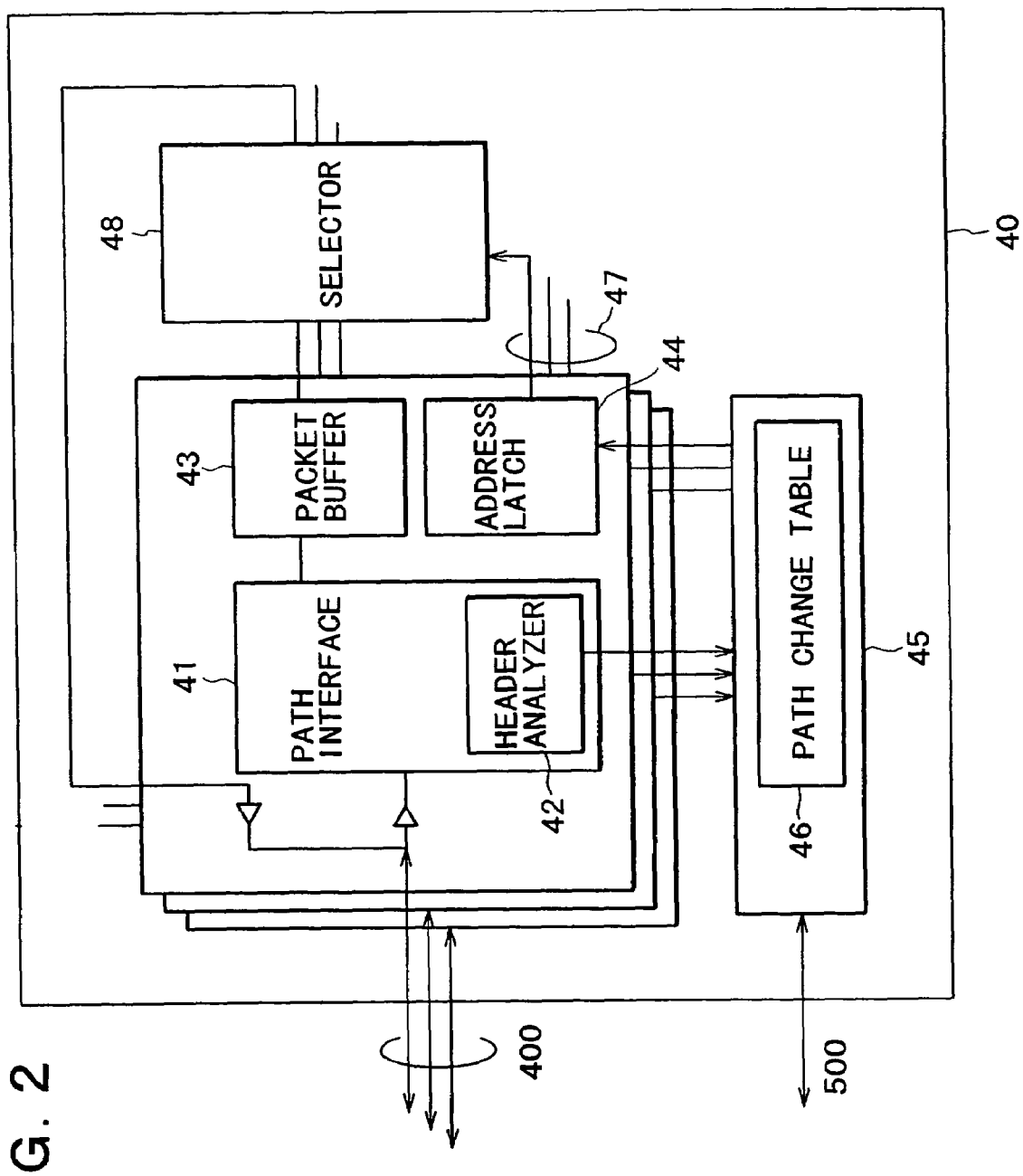
FIG. 2 is a block diagram of a switch provided in the disk control apparatus of the present invention.

Hereunder, a magnetic disk unit for storing mass data will be picked as an example to describe the present invention. However, the magnetic disk unit can be replaced with another large capacity storage unit such as a DVD unit.

In an embodiment of the present invention, a data path network configured by one or more switches should preferably be used for the connection between the plurality of channel interface units/disk interface units and the cache memory unit. A resource management network should preferably be used for the connection among the plurality of channel interface units/disk interface units, the switches, and the resource management unit. Each of the switches should preferably be provided with a path change table used to specify a path in the data path network, as well as path changing means for changing the table to another.

A data path network configured by one or more switches should preferably be used for the connection among the plurality of channel interface units, the plurality of disk interface units, the cache memory unit, and the resource management unit. Each of the switches should be provided with a path change table used to specify a path in the data path network and path changing means for changing the table to another.

Each switch should preferably be used for the connection between each of the plurality of channel interface units/disk interface units and the cache memory unit, thereby forming a disk control cluster. A data path network configured by one or more switches is used for the connection among the switches in the plurality of disk control clusters and a resource management network is used for the connection among the plurality of channel interface units, the plurality of disk interface units, the plurality of switches, and the resource management unit. Each of the switches should preferably be provided with a path change table used to specify a path in the data path network and path changing means for changing the table to another.

Each switch should preferably be used for the connection among each of the plurality of channel interface units, each of the plurality of disk interface units, the cache memory unit, and the resource management unit, thereby forming a disk control cluster. A data path network configured by one or more switches is used for the connection among the switches in the plurality of disk control clusters. Each of the switches should preferably be provided with a path change table used to specify a path in the data path network and path changing means for changing the table to another.

These and other problems and methods for solving those problems disclosed in this specification will become more apparent upon reading the following detailed description of embodiments and drawings of the present invention.

Hereunder, preferred embodiments of the present invention will be described with reference to the accompanying drawings.

<First Embodiment>

An embodiment of the present invention will be shown in FIGS. 1 through 4.

The disk control apparatus shown in FIG. 1 is configured by plural disk control clusters 100.

Each disk control cluster 100 includes an interface unit (channel interface unit) 10 with a host computer 60, an interface unit (disk interface unit) 20 with a magnetic disk unit 70, a cache memory unit 30, and a switch 40. A data path network 400 that covers the plurality of disk control clusters 100 is used for the connection between each of the channel interface units 10/disk interface units 20 and the cache memory unit 30 through the switch 40.

The disk control apparatus shown in FIG. 1 further includes a resource management unit 50 and it is connected to the plurality of channel interface units 10, the plurality of disk interface units 20, one or more switches 40, and the resource management unit 50 through a resource management network 500 that covers the plurality of disk control clusters 100.

In other words, every channel interface unit 10, every disk interface unit 20, every cache memory unit 30, or the resource management unit 50 can be accessed through the data path network 400 or resource management network 500.

Each channel interface unit 10 includes a microprocessor used to control the input/output to/from the host computer 60, an access controller used to control accesses to the cache memory unit 30, and an access controller used to control accesses to the resource management unit 50. The channel interface unit 10 transfers data between the host computer 60 and the cache memory unit 30, as well as control information between the microprocessor and the resource management unit 50.

Each disk interface unit 20 includes a microprocessor used to control the input/output to/from the magnetic disk unit 70, an access controller used to control accesses to the cache memory unit 30, and an access controller used to control accesses to the resource management unit 50. The disk interface unit 20 transfers data between the magnetic disk unit 70 and the cache memory unit 30, as well as control information between the microprocessor and the resource management unit 50.

Each disk interface unit executes the RAID functions.

The cache memory unit 30 includes a cache memory controller and a memory module and stores data to be stored in the magnetic disk unit 70 temporarily.

Each switch 40, as shown in FIG. 2, includes plural path interfaces 41 connected to the data path network 400, path changing means 45 connected to the resource management network 500, plural packet buffers 43, plural address latches 44, and a selector 48.

Although not shown in detail in FIGS. 1 and 2, the switch 40 includes plural ports provided for each channel interface unit 10. Each port is used for the connection to the channel interface unit 10. Each channel interface 10 also includes plural ports used for the connection to the switch 40. Plural data transfer paths are thus formed between one channel interface unit 10 and the switch 40.

The switch 40 and each disk interface unit 20 are also configured similarly to the above ones, so that plural data transfer paths are formed between one disk interface unit 20 and the switch 40.

The same configuration is also taken between the switch 40 and the cache memory 30, as well as between the switch 40 and another switch 40, so that plural data transfer paths are formed between the switch 40 and the cache memory unit 30, as well as between the switch 40 and each of other switches 40.

Each path interface 41 stores each packet received from the data path network 400 in its corresponding packet buffer 43 and takes out the address information through the header analyzer 42, then sends the analyzed/extracted packet address to the path changing means 45.

The path changing means 45, which includes a path change table 46, converts the packet address received from the header analyzer 42 to a target destination address and stores the result in its corresponding address latch 44.

The address latch 44 generates a selector control signal 47 according to the packet destination address and the selector 48 selects the destination of each packet stored in the packet buffer 43.

Consequently, when the values in the path change table 46 are updated properly, the packet path in the data path network 400 can be optimized.

The path change table 46, as shown in FIG. 4, denotes the correspondence between each original destination address and the path-changed destination address. The table should preferably be realized by a semiconductor memory.

In this table, addresses L1, L2, . . . Lm denote original addresses while P1, P2, and P3 denote path-changed addresses. The original address L1 becomes a path-changed address P1 under the condition 1 and it becomes a path-changed address P2 under the condition n.

The path changing means 45 accesses the resource management unit 50 through the resource management network 500 to obtain new information related to the path change table 46. According to this information, the path changing means 45 updates the contents in the path change table 46 and register error information, etc. in the resource management unit 50.

Each switch monitors the state of the data path network around itself, although it is not shown in the figure. The switch can detect errors that occur in that monitored portion of the data path network and the path changing means 45 reports the respective error contents to the resource management unit. According to this error information, the resource management unit updates the network configuration information. The switch obtains the updated network configuration information from the resource management unit to update the path change table 46.

As a result, every switch 40 in the data path network can retain the values in the path change table 46 properly and the resource management unit 50 can know information of every error, the transfer jam level, etc. in the data path network.

Figure 3:
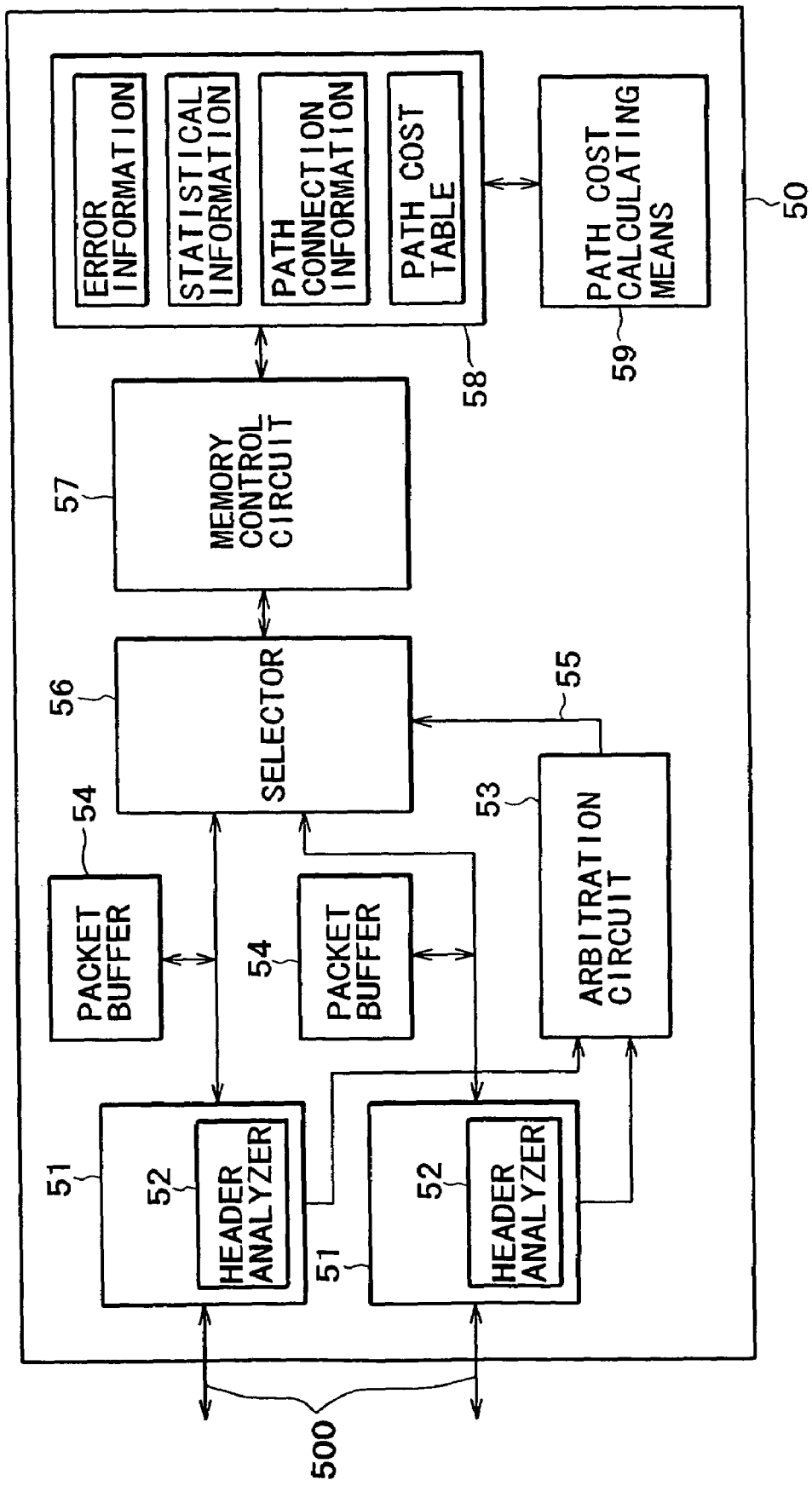
FIG. 3 is a block diagram of a resource management unit provided in the disk control apparatus of the present invention.

The resource management unit 50, as shown in FIG. 3, includes plural management network interfaces 51 connected to the resource management network 500, an arbitration circuit 53, plural packet buffers 54, a selector 56, a memory control circuit 57, a resource management memory 58, and path cost calculating means 59.

Each management network interface 51 stores packets received from the resource management network 500 in a packet buffer 54 and sends packet addresses to the arbitration circuit 53. The packet address information is taken out, analyzed, and extracted by the header analyzer 52 from each packet.

The arbitration circuit 53 arbitrates competition among accesses to the resource management memory 58 to generate a selector control signal 55 in correspondence with the management network interface 51 that enables the access.

As a result, the selector 56 enables only one management network interface 51 make accesses, thereby data is transferred through the memory control circuit 57 between the packet buffer 54 and the resource management memory 58 enabled to be accessed.

The resource management memory 58 stores control information of the disk control apparatus (ex., error information, statistical information (data path access rate, etc.), path connection information, path cost table, etc.).

This control information is kept/managed so as to be updated continuously to the latest through the resource management network as described above.

The path cost calculating means 59 uses the information in the resource management memory 58 to calculate the optimal path between given two points. The means 59 should preferably be realized by a microprocessor and a software program executed by the microprocessor.

There are some well-known algorithms used for calculating the optimal path. For example, there is an algorithm that selects the lowest-cost path from among available ones by calculating the number of switches to pass as a cost. Another method calculates the cost by adding the path jamming level to the above-described cost.

As a result of the optimal path calculation, the optimal value is obtained for each switch in the data path network in the path change table.

A description will be made for an example for reading data from the host computer 60 connected to the disk control apparatus of the present invention shown in FIG. 1.

At first, the host computer 60 issues a data read request to the channel interface unit 10 connected to itself.

Receiving the request, the microprocessor in the channel interface unit 10 accesses the resource management unit 50 to check whether or not the requested data is stored in the magnetic disk unit 70.

The resource management unit 50 includes a path change table for denoting the correspondence between the address of the requested data and the magnetic disk unit 70 that stores the data. The resource management unit 50 can thus identify the magnetic disk unit 70 that stores the requested data.

The microprocessor of the channel interface unit 10 that has received the request accesses the resource management unit 50 to check each cache memory unit 30 for the presence of the requested data.

The resource management unit 50 stores directory information of the data stored in each cache memory unit 30, so that the unit 50 can check each cache memory unit 30 for the presence of the requested data.

Consequently, when the requested data exists in a cache memory unit 30, the unit 50 transfers the data to the channel interface unit 10 through the data path network 400 so as to be received by the host computer 60.

In this case, the path change table 46 in the switch 40 selects the optimal path for data transfer in the data path network 400 regardless of the cache memory unit 30 of the disk control cluster 100, which stores the requested data.

Consequently, the microprocessor of the requested channel interface unit 10 is just required to specify the address of the target cache memory 30; it is not requested to know the state of any other path on the way.

When the requested data is not found in any cache memory unit 30, the microprocessor in the channel interface unit 10 issues a command to the microprocessor in the disk interface unit 20 connected to the magnetic disk unit 70 that stores the requested data so as to read the requested data and store it in a cache memory unit 30.

Receiving the command, the microprocessor in the disk interface unit 20 reads the data from the magnetic disk unit 70 and stores the data in a cache memory unit 30 through the data path network 400.

At this time, the path change table 46 in the switch 40 selects the optimal path for the data transfer in the data path network 400 regardless of the cache memory unit 30 of the disk control cluster 100, which stores the requested data.

Consequently, the microprocessor in the requested disk interface unit 20 is just requested to specify the address of the target cache memory unit 30; it is not requested to know the state of any other path on the way.

After storing the requested data in a cache memory unit 30, the microprocessor in the disk interface unit 20 notifies the microprocessor in the channel interface unit 10 of the data-stored cache memory unit 30. The microprocessor in the unit 10 is the processor that has issued the above command.

Receiving the notice, the microprocessor in the channel interface unit 10 reads the data from the cache memory unit 30 and sends the data to the host computer 50.

Also in this data transfer in the data path network, the path change table 46 in the switch 40 selects the optimal path.

While one resource management unit 50 is provided outside plural disk control clusters in this embodiment, it is also possible to provide a resource management unit in each of those disk control clusters and connect a channel interface unit, a disk interface unit, and a switch to the resource management unit through the resource management network in each disk control cluster, connect the resource management unit in each disk control cluster to others through the resource management network, and connect each switch provided outside each disk control cluster to the resource management unit in each disk control cluster through the resource management network.

In this embodiment, for a data transfer among a channel interface unit 10, a disk interface unit 20, and a cache memory unit 30 through the data path network 400 in response to an access from a host computer 50, the path change table 46 in the subject switch 40 always selects the optimal path. Consequently, this embodiment can cope with an increase/decrease in the number of channel interface units 10/disk interface units 20, as well as the configuration changes of the connection among them.

In addition, the path changing means 45 can change the path change table 46 to another in the switch 40 used for optimizing the transfer path in the data path network, according to the information from the resource management unit 50. The path changing means 45 can thus adjust the path according to the error information and/or the state of the network load to use the band in the data path network most effectively.

In addition, when in a data transfer among a channel interface unit 10/disk interface unit 20 and a cache memory unit 30, the microprocessor in each interface unit is not requested to know how to control the path on the way. Therefore, the path controlling of the microprocessor does not disturb any data transfer to/from the host computer 60 and the magnetic disk unit 70, thereby the performance of the disk control apparatus can be prevented from degradation that might occur due to the data path network that would otherwise be complicated.

<Second Embodiment>

Figure 5:
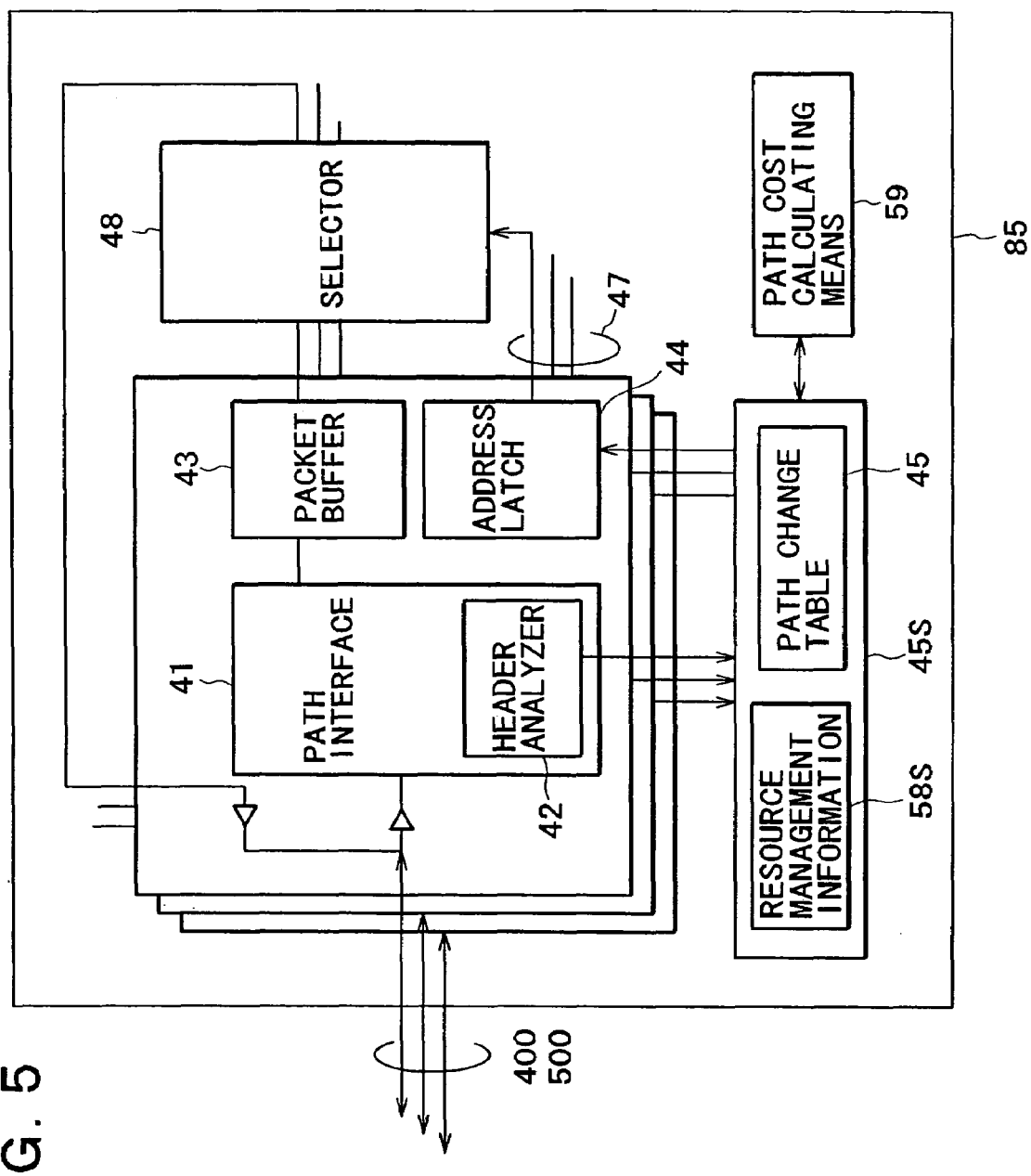
FIG. 5 is a block diagram of another switch provided in the disk control apparatus of the present invention.
Figure 6:
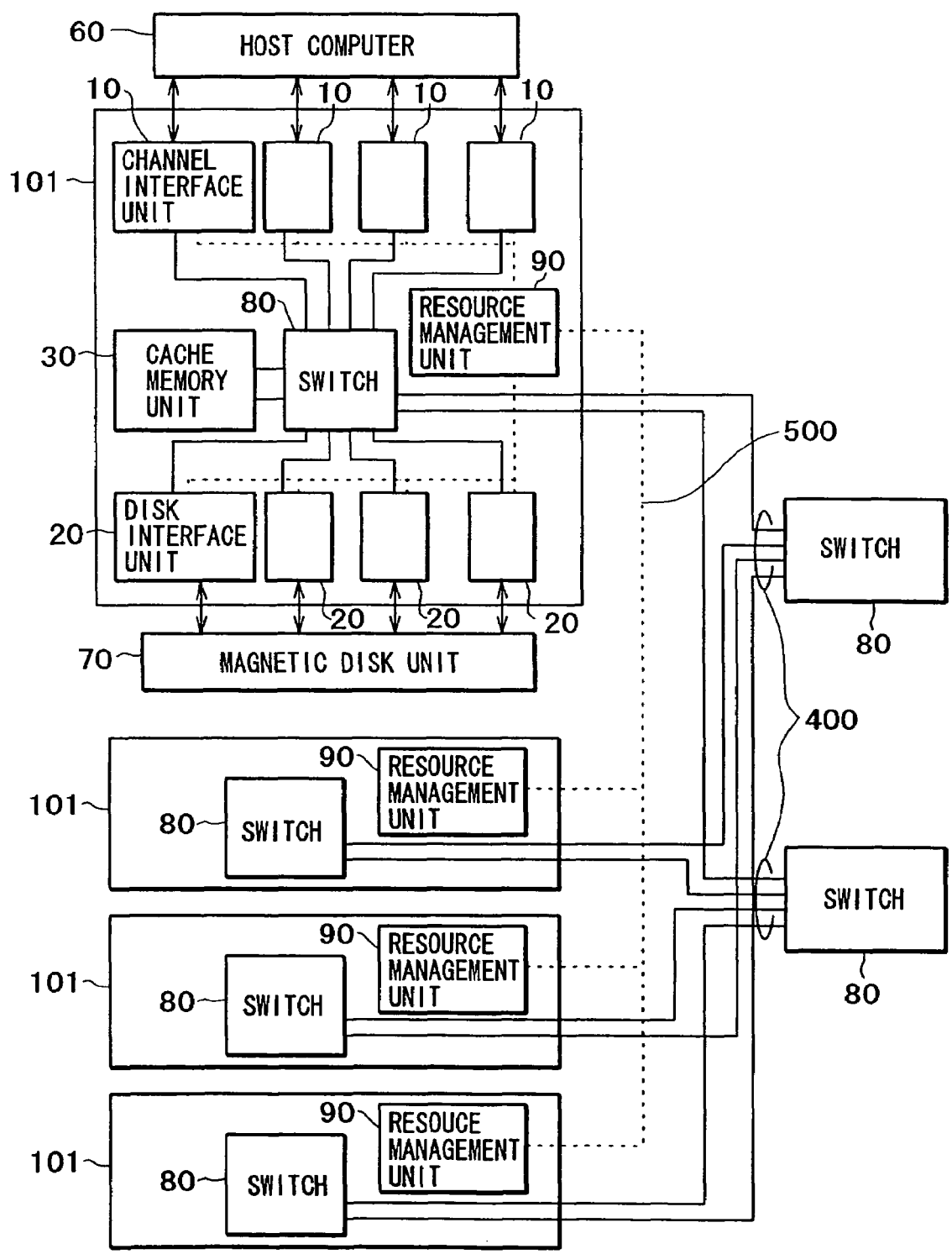
FIG. 6 is a block diagram of a conventional disk control apparatus.
Figure 7:
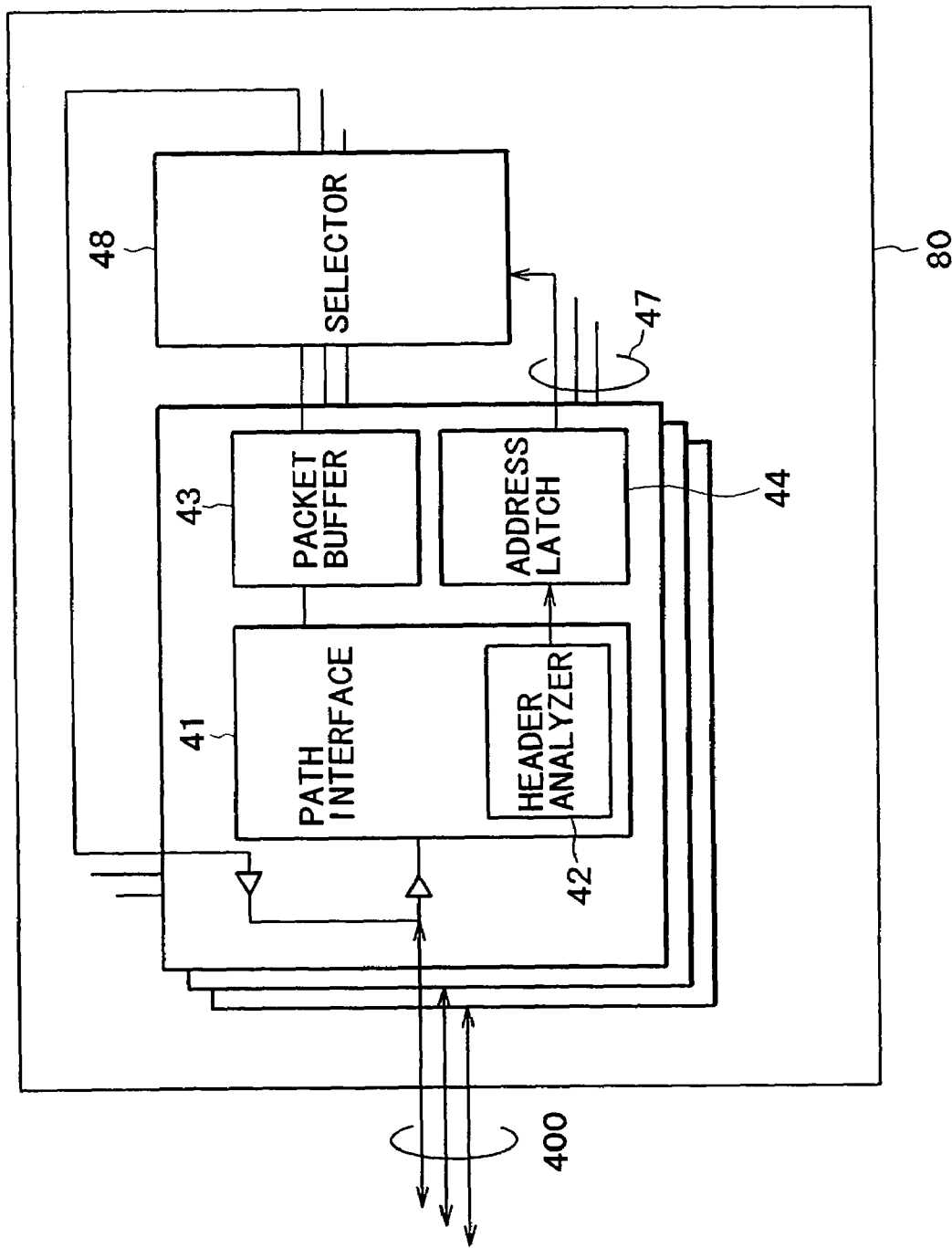
FIG. 7 is a block diagram of a switch provided in the conventional disk control apparatus.
Figure 8:
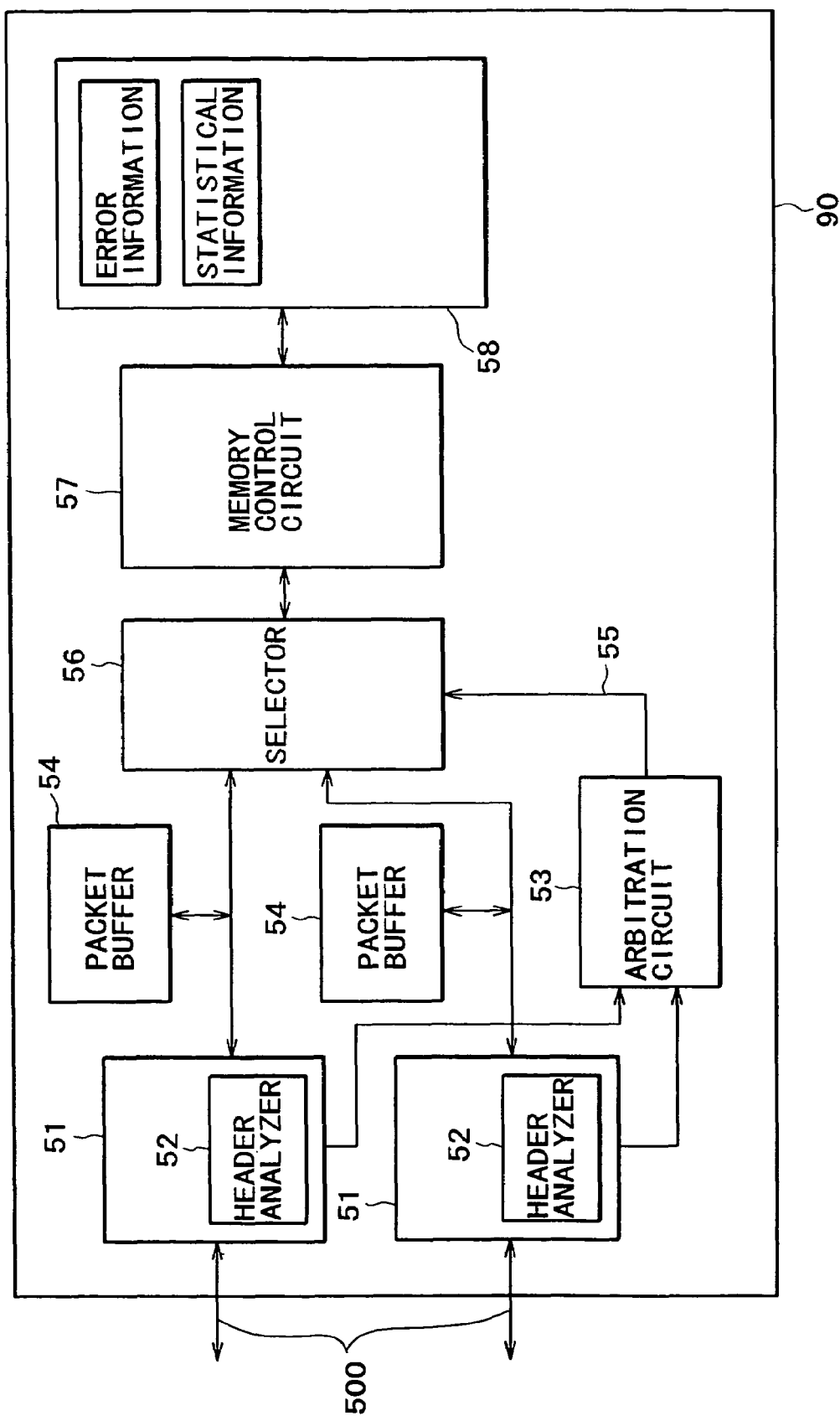
FIG. 8 is a block diagram of a resource management unit provided in the conventional disk control apparatus.
Figure 9:
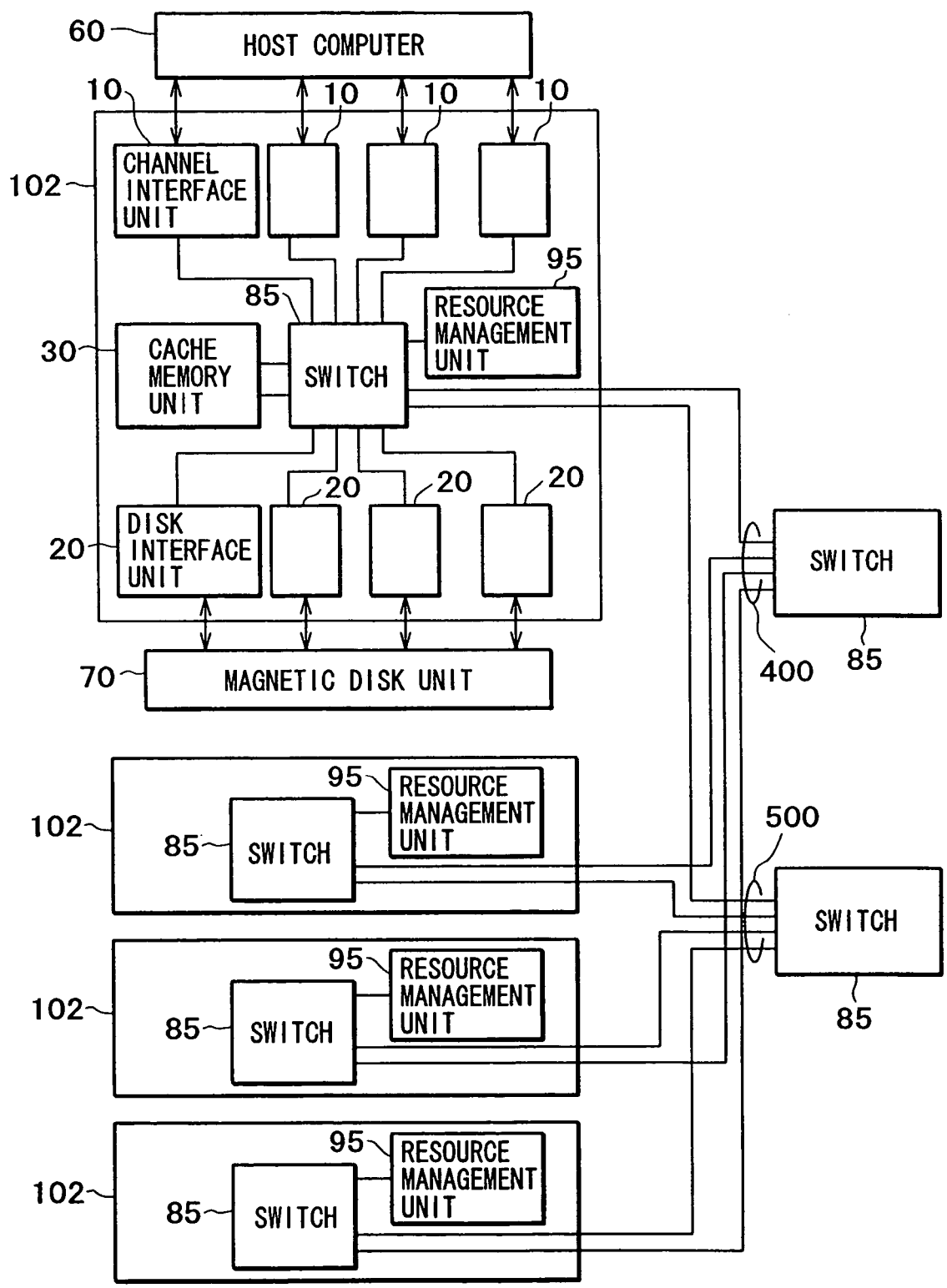
FIG. 9 is another block diagram of the disk control apparatus of the present invention.
Figure 10:
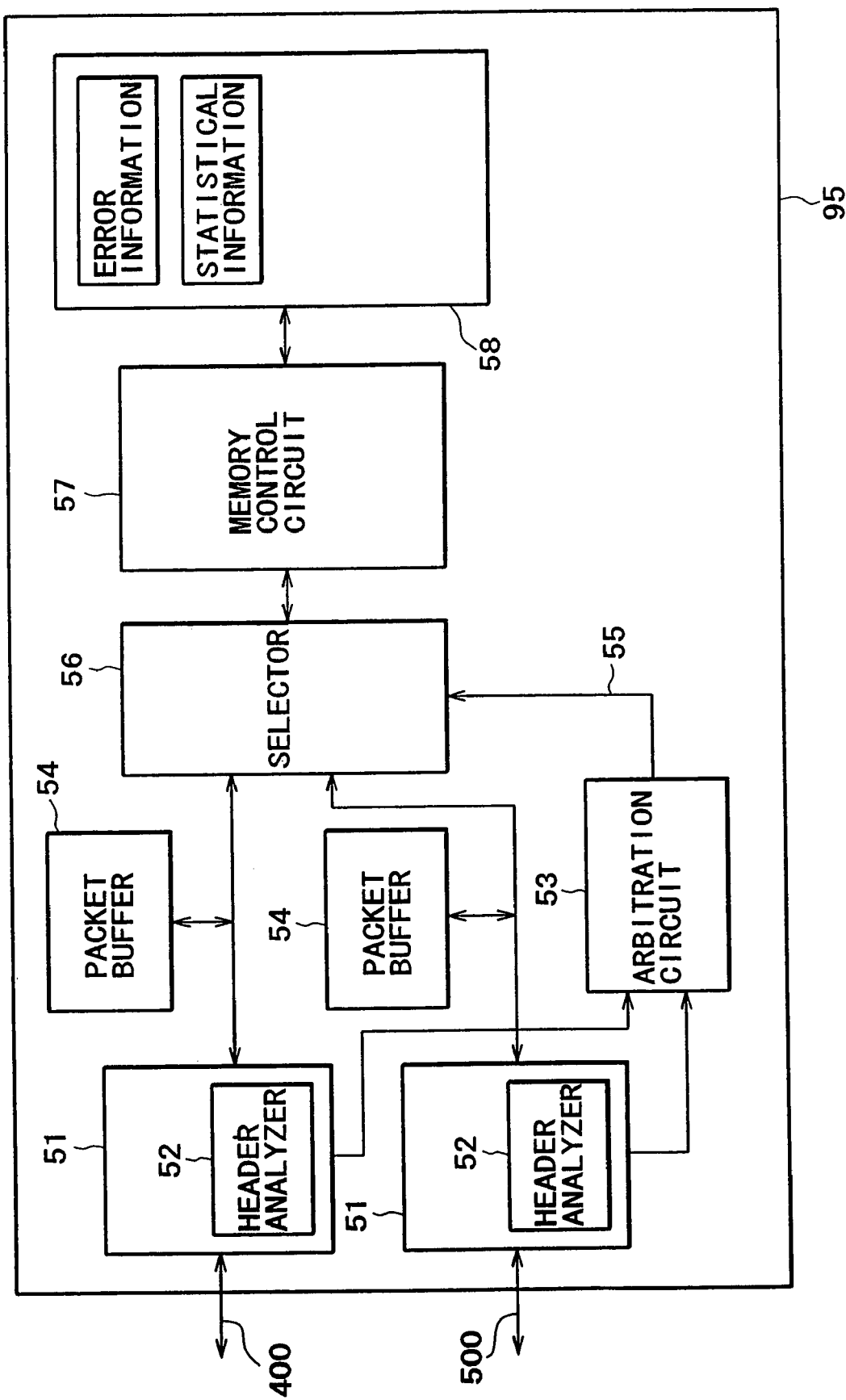
FIG. 10 is another block diagram of the resource management unit provided in the disk control apparatus of the present invention.

FIGS. 5, 9, and 10 show the second embodiment of the present invention.

The configuration of the disk control apparatus in this second embodiment shown in FIG. 9 is the same as that in the first embodiment shown in FIG. 1 except that a resource management unit 95 is disposed in each disk control cluster 102, the same signal lines as those of the data path network are used to connect those resource management units through plural disk control clusters 102, and a switch 85 is newly employed to enable the data path network and the resource management network to be used commonly by those resource management units.

In this second embodiment, the data path network 400 and the resource management network 500 are used commonly by the data transfer between each of the channel interface units 10/disk interface units 20 and cache memory units 30 and by the control information transfer between each of the channel interface units 10/disk interface units 20, each of the switches 85, and each of the resource management units 95. The disk control apparatus can thus be reduced in size.

In this second embodiment shown in FIG. 10, the configuration of the resource management units 95 is the same as that of those in the first embodiment shown in FIG. 3 except that the path cost calculating means 59 is omitted and information in the path cost table, etc. used to calculate path costs is deleted from the resource management memory 58.

As to be described later, each switch 85 calculates the path costs.

The configuration of the switches, as shown in FIG. 5, is the same as that of those in the first embodiment shown in FIG. 2 except that the data path network 400 and the resource management network 500 are used commonly, a resource management information 58S is provided in the path changing means 45S and the path cost calculating means 59 is employed. The resource management information 58S is part of the information in the resource management memory 58 of the resource management unit 50 (see FIG. 1) in the first embodiment. The information 58S is distributed in the path changing means 45S of each switch 85.

Each of the packets used in the data path network and the packets used in the resource management network includes a dedicated identifier so as to be distinguished from others.

Each path interface 41 uses such a dedicated identifier to store, in the packet buffer 43, each packet received from the data path network 400 when the packet is for the data path network 400 and the header analyzer 42 takes out the address information from the packet to analyze and extract the address and sends the result to the path changing means 45S.

The path changing means 45S, which includes a path change table 46, converts the address of each packet received from the header analyzer 42 to a target address, then stores the result in an address latch 44.

The address latch 44 then generates a selector control signal 47 according to the packet address and the selector 48 selects the destination of the packet stored in the packet buffer 43.

Consequently, the packet path in the data path network 400 can be optimized by changing the values in the path change table 46 properly.

When the packets are of the resource management network, the header analyzer 42 extracts only the resource management network packets addressed to its switch according to the dedicated identifiers to send them to the path changing means 45S. Consequently, no packet is stored in any packet buffer 43.

When resource management network packets are to be sent from a switch 85 to the resource management unit 95, the path changing means 45S stores those packets in a packet buffer 43 and outputs each packet address information to an address latch 44, thereby the address latch 44 generates a selector control signal 47 according to each packet address. The selector 48 thus selects the destination of each resource management network packet stored in the packet buffer 43.

The path cost calculating means 59 uses the resource management information 58S to calculate the optimal path and updates the contents in the path change table 46 with the result.

The path changing means 45S transfers the resource management information 58S to another switch 85 with use of a broadcasting method through the resource management network 500, then maintains and manages the state of the whole data management network.

The operation of this second embodiment is the same as that of the first embodiment except that the resource management network 500 and the data management network 400 are used commonly for packets.

Consequently, the path change table 46 in each switch 85 selects the optimal path for transferring packets in the subject data path network regardless of how the disk control apparatus is connected to the network.

The operation of each component to read/write data from the host computer 60 to the magnetic disk unit 70 in this second embodiment is the same as that in the first embodiment except that common signal lines are used to transfer both resource management network packets and data path network packets and each switch 85 calculates path costs in itself.

It is also possible to enable any one of the plurality of switches 85 to calculate path costs and broadcast the result to all the other switches.

According to this second embodiment, therefore, because the path change table 46 in each switch 85 always selects the optimal path for each data transfer between a channel interface unit 10/disk interface unit 20 and a cache memory unit 30, the embodiment can cope with an increase/decrease in the number of the channel interface units 10/disk interface units 20, as well as the configuration of the connection between those units 10/20 and 30.

The path change table 46 in each switch 85 used to optimize the transfer path in the data network as described above can be changed to another by the path changing means 45, so that the band in the data path network can be used most effectively when it is adjusted according to the error information and/or the state of the network load.

In addition, the microprocessor in each interface unit is not requested to know how the paths on the way are controlled during a data transfer between a channel interface unit 10/disk interface unit 20 and a cache memory unit 30. Thus, controlling of those paths does not disturb the data processings to/from the host computer 60 and/or the magnetic disk unit 70, thereby the performance of the disk control apparatus is prevented from degradation, which might otherwise be caused by a complicated data path network.

As described above, according to the present invention, the path change table in each switch always selects the optimal path for each data transfer between a channel interface unit/disk interface unit and a cache memory unit in a data path network. The disk control apparatus can thus cope with an increase/decrease in the number of channel interface units/disk interface units, as well as the configuration of the connection between those units.

Path adjustment is enabled according to error information and/or the state of the network load, thereby the data path network band can be used most effectively. In addition, the microprocessor in each interface unit is not requested to know how the paths on the way are controlled during any data transfer in the data path network, so that the performance of the disk control apparatus is prevented from degradation, which might otherwise be caused by a complicated data path network.

The foregoing invention has been described in terms of preferred embodiments. However, those skilled in the art will recognize that many variations of such embodiments exist. Such variations are intended to be within the scope of the present invention and the appended claims.

What we claim is:

1. A storage system comprising:
    a plurality of control units each having a first switch which is configured to connect only components within each control unit and connected with each other via a network; and
    a plurality of disk units connected to the plurality of control units,
    wherein at least one of the plurality of control units has a resource management unit connected to the first switch thereof and configured to gather resource information from resources included in the storage system,
    wherein the first switch of the at least one of the plurality of control units selects one of a plurality of paths used for transferring data packets from one of the plurality of control units to another one of the plurality of control units based on the resource information and sends the data packets by the one of the plurality of paths in the network.

2. The storage system according to claim 1, wherein the plurality of control units have a processing unit which controls the data packet transfer.

3. The storage system according to claim 2, wherein the first switch has a path information table, updates the path information table based on the resource information, and selects the one of a plurality of paths based on the path information table.

4. The storage system according to claim 1, further comprising at least one second switch configured to be connected to the plurality of control units via the network.

5. The storage system according to claim 4, wherein the resource management unit calculates cost of the plurality of paths based on the resources information, wherein the at least one second switch changes the one of the plurality of paths to the other one of the plurality of paths in accordance with a result of calculation of the cost.

6. The storage system according to claim 5, wherein the at least one second switch changes the one of the plurality of paths to the other one of the plurality of paths when the cost of the one of the plurality of paths higher than the cost of the other one of the plurality of paths.

7. Storage system according to claim 4, wherein the at least one second switch calculates cost of the plurality of paths based on the resource information, wherein the at least one second switch changes the one of the plurality of paths to the other one of the plurality of paths in accordance with a result of calculation of the cost.

8. The storage system according to claim 7, wherein the at least one second switch changes the one of the plurality of paths to the other one of the plurality of paths when the cost of the one of the plurality of paths higher than the cost of the other one of the plurality of paths.

9. The storage system according to claim 1, wherein each of the plurality of control units have a cache memory stores data to be stored in the plurality of disk units.

* * * * *